US009305085B2

(12) United States Patent
Biyani et al.

(10) Patent No.: US 9,305,085 B2
(45) Date of Patent: Apr. 5, 2016

(54) ONLINE THREAD RETRIEVAL USING THREAD STRUCTURE AND QUERY SUBJECTIVITY

(71) Applicant: International Business Machines Corporation, Armonk, NY (US)

(72) Inventors: Prakhar Biyani, State College, PA (US); Debapriyo Majumdar, Bangalore (IN); Singh Amit Kumar Rambachan, Croton-on-Hudson, NY (US); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/090,703

(22) Filed: Nov. 26, 2013

(65) Prior Publication Data

US 2015/0149462 A1    May 28, 2015

(51) Int. Cl.
*G06F 17/30*          (2006.01)
*G06F 7/00*           (2006.01)

(52) U.S. Cl.
CPC ...... *G06F 17/30705* (2013.01); *G06F 17/3053* (2013.01); *G06F 17/30598* (2013.01); *G06F 17/30707* (2013.01); *G06F 17/30876* (2013.01)

(58) Field of Classification Search
CPC .............. G06F 17/30522; G06F 17/30; G06F 17/30705; G06F 17/30598; G06F 17/30707; G06F 17/3071; G06F 17/30876
USPC ........................................................ 707/737
See application file for complete search history.

(56) References Cited

U.S. PATENT DOCUMENTS

| 7,421,429 | B2 | 9/2008 | Thota |
| 7,437,382 | B2 | 10/2008 | Zhang et al. |
| 8,161,032 | B2 | 4/2012 | Sakurai |
| 8,209,619 | B2 | 6/2012 | Carrer et al. |
| 2006/0112036 | A1* | 5/2006 | Zhang et al. ............ 706/20 |
| 2007/0282940 | A1 | 12/2007 | Sakurai |
| 2008/0249762 | A1* | 10/2008 | Wang et al. ............ 704/9 |
| 2010/0030753 | A1 | 2/2010 | Nad et al. |
| 2012/0185252 | A1* | 7/2012 | Wang et al. ............ 704/251 |
| 2013/0113952 | A1* | 5/2013 | Misawa ............ 348/222.1 |
| 2014/0244610 | A1* | 8/2014 | Raman et al. ............ 707/706 |

OTHER PUBLICATIONS

He, Ben, et al., "An Effective Statistical Approach to Blog Post Opinion Retrieval," ACM Conference on Information and Knowledge Management (CIKM), Oct. 26-30, 2008, pp. 1063-1072, Napa Valley, California, USA.

(Continued)

*Primary Examiner* — Kuen Lu
(74) *Attorney, Agent, or Firm* — Ference & Associates LLC

(57) ABSTRACT

Methods and arrangements for handling queries for a discussion thread. A contemplated method includes: receiving a query; automatically classifying the query as subjective, objective or neither; and upon classifying the query as subjective or objective: calculating, for discussion threads of the query, at least one of: a subjectivity score and an objectivity score; determining a degree of relevance to the query of at least one of: the discussion threads, and at least one post in the at least one discussion thread; and ranking the discussion threads based on said calculating and determining. Other variants and embodiments are broadly contemplated herein.

16 Claims, 3 Drawing Sheets

(56) References Cited

OTHER PUBLICATIONS

Bhatia, Sumit, et al., "Classifying User Messages for Managing Web Forum Data," Fifteenth International Workshop on the Web and Databases (WebDB2012), May 20, 2012, 6 pages, Scottsdale, AZ, USA.
Albaham, Ameer Tawfik, et al., "Quality-Biased Retrieval in Online Forums," Journal of Theoretical and Applied Information Technology, Apr. 15, 2012, pp. 55-62, vol. 38, No. 1, 2005-2012 JATIT & LLS—URL: www.jatit.org, Publication location unknown.
Craswell, Nick, et al., "Relevance Weighting for Query Independent Evidence," Special Interest Group on Information Retrieval (SIGIR '05), Aug. 15-19, 2005, 8 pages, Salvador, Brazil.
Bhatia, Sumit, et al., "Adopting Inference Networks for Online Thread Retrieval," Association for the Advancement of Artificial Intelligence, Jan. 20, 2010, 6 pages, URL: http://www.ubuntuforums.org/.
Song, Yang, et al., "Post-Ranking Query Suggestion by Diversifying Search Results," Special Interest Group on Information Retrieval (SIGIR '11), Jul. 24-28, 2011, 10 pages, Beijing, China.
Manning, Christopher D., et al., "An Introduction to Information Retrieval," Cambridge University Press, Cambridge, England, Online edition (c) 2009 Cambridge UP, 4 pages, can be found at: http://nlp.stanford.edu/IR-book/pdf/irbookonlinereading.pdf; Accessed on Nov. 26, 2013.
Zucchini, Walter, "Applied Smoothing Techniques Part 1: Kernel Density Estimation,", Oct. 2003, 20 pages, can be found at: http://isc.temple.edu/economics/Econ616/Kernel/ast_part1.pdf; Accessed on Nov. 26, 2013.

* cited by examiner

ONLINE THREAD RETRIEVAL USING THREAD STRUCTURE AND QUERY SUBJECTIVITY

BACKGROUND

Generally, in online discussion forums, queries reflect the intent of a user while also setting forth a particular need for information. Particularly, while some queries may seek facts and information that can be verified, and can thus be termed "objective" queries, others may seek personal opinions or viewpoints that can be termed "subjective" queries. Most often, conventional arrangements for managing queries and discussion forums fail to adequately reconcile or distinguish between these two types of queries, with less than optimal results.

BRIEF SUMMARY

In summary, one aspect of the invention provides a method of handling queries for an online discussion forum, the method comprising: receiving a query; automatically classifying the query as subjective, objective or neither; and upon classifying the query as subjective or objective: calculating, for discussion threads of the query, at least one of: a subjectivity score and an objectivity score; determining a degree of relevance to the query of at least one of: the discussion threads, and at least one post in the at least one discussion thread; and ranking the discussion threads based on the calculating and determining.

Another aspect of the invention provides an apparatus comprising: at least one processor; and a computer readable storage medium having computer readable program code embodied therewith and executable by the at least one processor, the computer readable program code comprising: computer readable program code configured to receive a query; computer readable program code configured to automatically classify the query as subjective, objective or neither; and computer readable program code configured, upon classifying the query as subjective or objective, to: calculate, for discussion threads of the query, at least one of: a subjectivity score and an objectivity score; determine a degree of relevance to the query of at least one of: the discussion threads, and at least one post in the at least one discussion thread; and rank the discussion threads based on the calculating and determining.

An additional aspect of the invention provides a computer program product comprising: a computer readable storage medium having computer readable program code embodied therewith, the computer readable program code comprising: computer readable program code configured to receive a query; computer readable program code configured to automatically classify the query as subjective, objective or neither; and computer readable program code configured, upon classifying the query as subjective or objective, to: calculate, for discussion threads of the query, at least one of: a subjectivity score and an objectivity score; determine a degree of relevance to the query of at least one of: the discussion threads, and at least one post in the at least one discussion thread; and rank the discussion threads based on the calculating and determining.

A further aspect of the invention provides a method of handling queries for an online discussion forum, the method comprising: receiving a query; automatically classifying the query as subjective or objective; thereupon calculating, for discussion threads of the query, at least one of: a subjectivity score and an objectivity score; the calculating comprising: applying a maximum entropy model; and incorporating, with respect to at least one discussion thread, at least one member taken from the group consisting essentially of: a number of posts in a discussion thread; average number of words in posts, presence of a predetermined pattern among posts, a number of authors of posts within a discussion thread, average depth of each post, maximum depth of a post, and length of at least one reply; and determining a degree of relevance to the query of: the discussion threads, and at least one post in the at least one discussion thread; the determining of the degree of relevance of the query to the discussion threads comprising: iteratively determining a relevance score with respect to each post in a discussion thread and then accepting a maximum relevance score with respect to a post in a discussion thread; determining a penalty/reward regulizer with respect to choosing a predetermined number of posts for calculating a relevance score of a thread; and including at least one of: a subjectivity score of the thread and an objectivity score of the thread; and ranking the discussion threads based on the calculating and determining of a degree of relevance of the query to the discussion threads.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
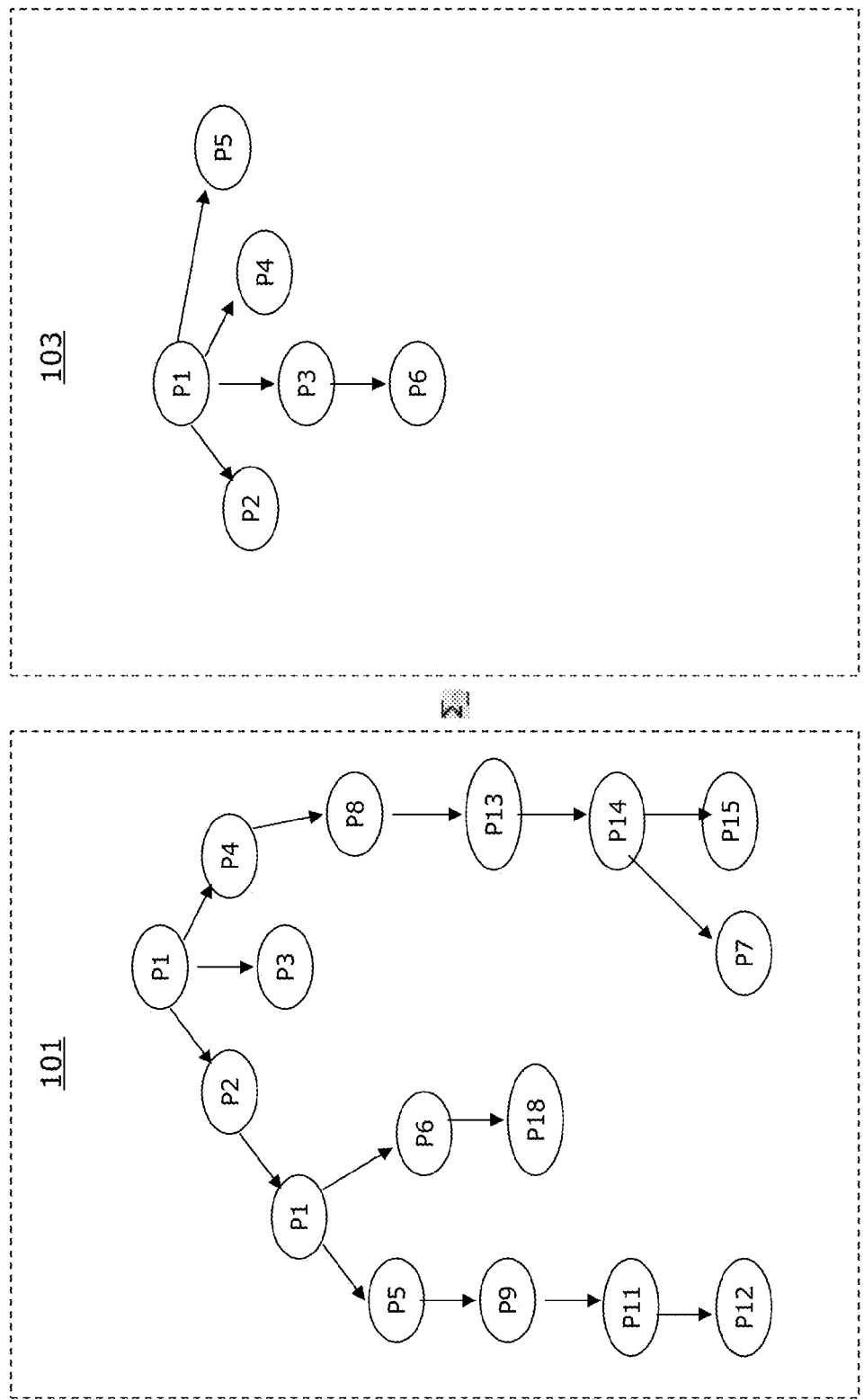
FIG. 1 schematically illustrates relative progress for addressing a subjective query and objective query in a discussion forum.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are systems and arrangements which effectively handle both of the query classes discussed above, i.e., subjective and objective. Particularly, given a query, threads in discussion forums are ranked depending on their query class.

Generally, in accordance with a context of at least one embodiment of the invention, and from a user's perspective, queries can be answered by merely looking at a small number of posts in a thread of discussion. In such a situation, commonly the case with objective queries, the relevance of each and every post might not be of great concern, as a ranking task may be no more complex than a general ranking for query results; in other words, users are likely to see and consider most if not all of the posts (or might be satisfied simply by looking at one or two posts likely to provide straightforward answers to an objective query) and thus a finer-grained level of ranking may not be worthwhile or necessary.

On the other hand, in accordance with a context of at least one embodiment of the invention, subjective queries tend to be answered in threads that can involve significant discussion, i.e., they often cannot be answered in just a few posts. Thus, in such a situation it might be helpful for a user to review a significant number of posts in a thread that are relevant to the query. Accordingly, a finer-grained determination of overall relevance with respect to the thread topic may well be important here, as a user might not be satisfied (in determining an answer to the query) merely with looking at one or two posts.

In accordance with a context of at least one embodiment of the invention, FIG. 1 schematically illustrates relative progress for addressing a subjective query (101) and objective query (103) in a discussion forum, by way of an illustrative example. Based on the number of posts or replies, the length of the subjective query discussion forum (101) here is 28 while that of the objective query discussion forum (103) is 9.

Figure 2:
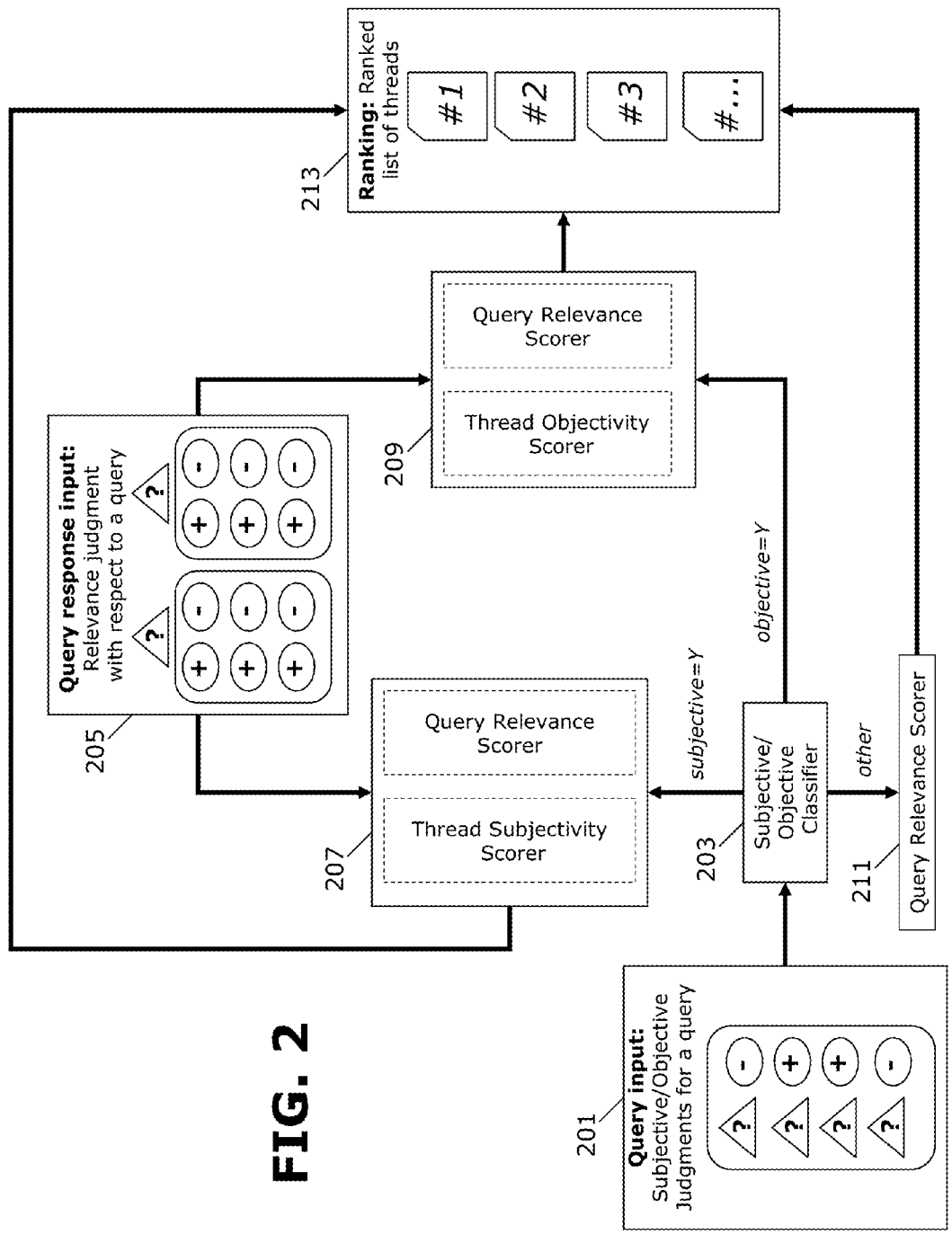
FIG. 2 schematically illustrates a system architecture.

FIG. 2 schematically illustrates a system architecture, in accordance with at least one embodiment of the invention. In a manner to be appreciated more fully below, determinations are made on two levels. A query is accepted (201), and a judgment as to subjectivity or objectivity is made, via a subjective/objective classifier 203; possible determinations here are subjective, objective or "other". Generally, the "other" classification may come about when it is difficult or inconclusive to determine between subjectivity and objectivity. Query response input (205) is also accepted, e.g., posts responding to the query, which are organized in accordance with one or more threads subsidiary to the original query. Thus, one or more threads can be started in response to a query in a discussion forum, by way of initial answers to the query, and further posts can be made by one or more users in response to those initial answers. Some threads may contain nothing more than an initial response to the query, and no further responses to the initial response. This query response input 205 is then evaluated as to its relevance to the initial query.

In accordance with at least one embodiment of the invention, if it is determined that the query is subjective ("subjective=Y") then a first engine 207 determines, via respective scorers, a degree of subjectivity of threads as well as relevance of threads and posts to the query. On the other hand, if it is determined that the query is objective ("objective=Y") then a second engine 209 determines, via respective scorers, a degree of objectivity of threads as well as relevance of threads and posts to the query. If the query is determined not to be subjective or objective (e.g., a determination for either is inconclusive), then a query relevance scorer 211 determines a relevance of threads and posts to the query. Input from engines 207/209 and/or scorer 211 is then sent to a ranking engine 213 which produces a ranked list of threads.

In accordance with at least one embodiment of the invention, to determine thread relevance, there are collected, for each query q, top relevant threads (e.g., via employing a suitable ranking function such as Okapi BM25 [for a background discussion on Okapi BM25, see Christopher D. Manning, Prabhakar Raghavan, Hinrich Schütze, *An Introduction to Information Retrieval*, Cambridge University Press, 2009, pp. 232-234]) and a relevance judgment is determined for those threads. To determine post relevance, for each query q, relevant threads are collected (the same "top relevant threads" as just noted) and, for all posts in those threads, a relevance judgment is determined with respect to the query. To determine a degree of objectivity or subjectivity of a thread, then for each thread a relevance judgment is determined to classify the type of discussion taking place in each thread, and (via scoring) to what degree. Such scoring is independent of the query itself, and of any subjective/objective determination made with respect to the query. However, similar calculations may take place here as with the subjective/objective query classifier 203, e.g., via using the first post and title of a thread.

In accordance with at least one embodiment of the invention, steps towards ranking threads may proceed as follows. The steps outlined below are generally in reference to queries determined to be subjective, but (unless otherwise noted) analogous considerations can be employed in the case of objective queries. For queries classified as "neither" or "other", scoring and ranking can merely leave out any determinations of subjectivity/objectivity discussed herein.

Accordingly, in accordance with at least one embodiment of the invention, relevance of a query q with respect to a thread $t_i$ is provided by Equation (1), and forms the basis of the final ranking that takes place at 213. The equation is iterated with respect to posts from k=1 to k=(number of posts in thread), and the maximum score for a post in the thread is then applied to the thread itself.

$$p(\text{relevance}=1|t_i;q) = \alpha \cdot \text{relevance}[\text{post}(t_i,j),q]_k + \beta \cdot \text{post\_used}_k + \gamma \cdot p(\text{Subjective}|t_i) \quad (1)$$

Generally, p indicates probability. Values of the parameters $\alpha$, $\beta$ and $\gamma$, balancing factors, are determined using multilevel relevance judgments as described further below, and are learned. In scoring relevance for an objective query, $\alpha$ in Equation 1 should dominate over $\beta$, i.e., here, the relevance of a post would matter more than how many posts in the thread are relevant. For subjective queries, opposite considerations would be apply; thus, $\beta$ should dominate over $\alpha$.

In accordance with at least one embodiment of the invention, $p(\text{Subjective}|t_i)$ is a score that is independent of the query. A maximum entropy model is built to estimate this score based on several features such as: number of posts in a thread; average number of words per post; presence of a predetermined pattern in a title or first post of a thread; a number of authors throughout the thread; average depth of each post; maximum depth of a post; maximum length of reply to posts (i.e., the number of posts in a chain of reply); and others, etc. Maximum entropy models generally involve monotonic features that represent stronger evidence with bigger values. However, with non-monotonic features present here, they are converted into monotonic features. Accordingly, kernel density estimation (KDE) is used to estimate the probability density of a given point (i.e., a value of feature $F_i$). (For background information on KDE, see W. Zucchini, "Applied smoothing techniques," Part 1 Kernel Density Estimation., 2003, isc.temple.edu/economics/Econ616/Kernel/ast_part1.pdf.) Thus:

$$p(\text{Subjective}|F_i) = 2 \cdot \left\{ \frac{p(\text{Subjective}) \cdot F(\text{Subjective}|F_i)}{p(\text{Subjective}) \cdot F(\text{Subjective}|F_i) + p(\sim\text{Subjective}) \cdot F(\sim\text{Subjective}|F_i)} \right\}$$

Here, F represents a density function estimated using KDE, and p(Subjective) is the prior probability of having a subjective thread estimated from training data using a maximum likelihood estimator.

Further, in accordance with at least one embodiment of the invention, $\text{relevance}[\text{post}(t_i,j),q]_k$ is the relevance of post j in thread $t_i$ with respect to the query q. It is calculated using a query likelihood model using smoothing, wherein:

$$\text{relevance}[\text{post}(t_i, q)] = \log p(q|p_{ij}) \quad (2)$$

$$= \prod_{w \in q} p(w|p_{ij})$$

$$= \prod_{w \in q} (1-\lambda_1) \cdot p_{ml}(w|p_{ij}) +$$

-continued
$$\lambda_1 \left[ \begin{array}{c} (1-\lambda_2) \cdot p_{ml}(w|\text{parent}(p_{i0})) + \\ \lambda_2\{(1-\lambda_3) \cdot p_{ml}(w|t_i) + \lambda_3 \cdot p_{ml}(w|C)\} \end{array} \right]$$

In accordance with at least one embodiment of the invention, $\text{relevance}[\text{post}(t_i,j),q]_k$ represents the average relevance of top-k (scorewise)$\text{post}_{ij}$ in thread $t_i$. Here k is not chosen apriori. For objective threads, a number of queries k should be small while for subjective threads k should be large, in both cases taking into account the total number of posts in the thread. A regulizer $\text{post\_used}_k$ can then be used. Particularly, $\text{post\_used}_k$ represents a penalty or reward in choosing only k posts for calculating the relevance score of the thread. It could be as simple as a calculation of graph cover for k, such that:

$$\text{graphcvr}_k = \frac{k}{\text{total\_number\_of\_posts\_in\_thread}} \quad (3)$$

Figure 3:
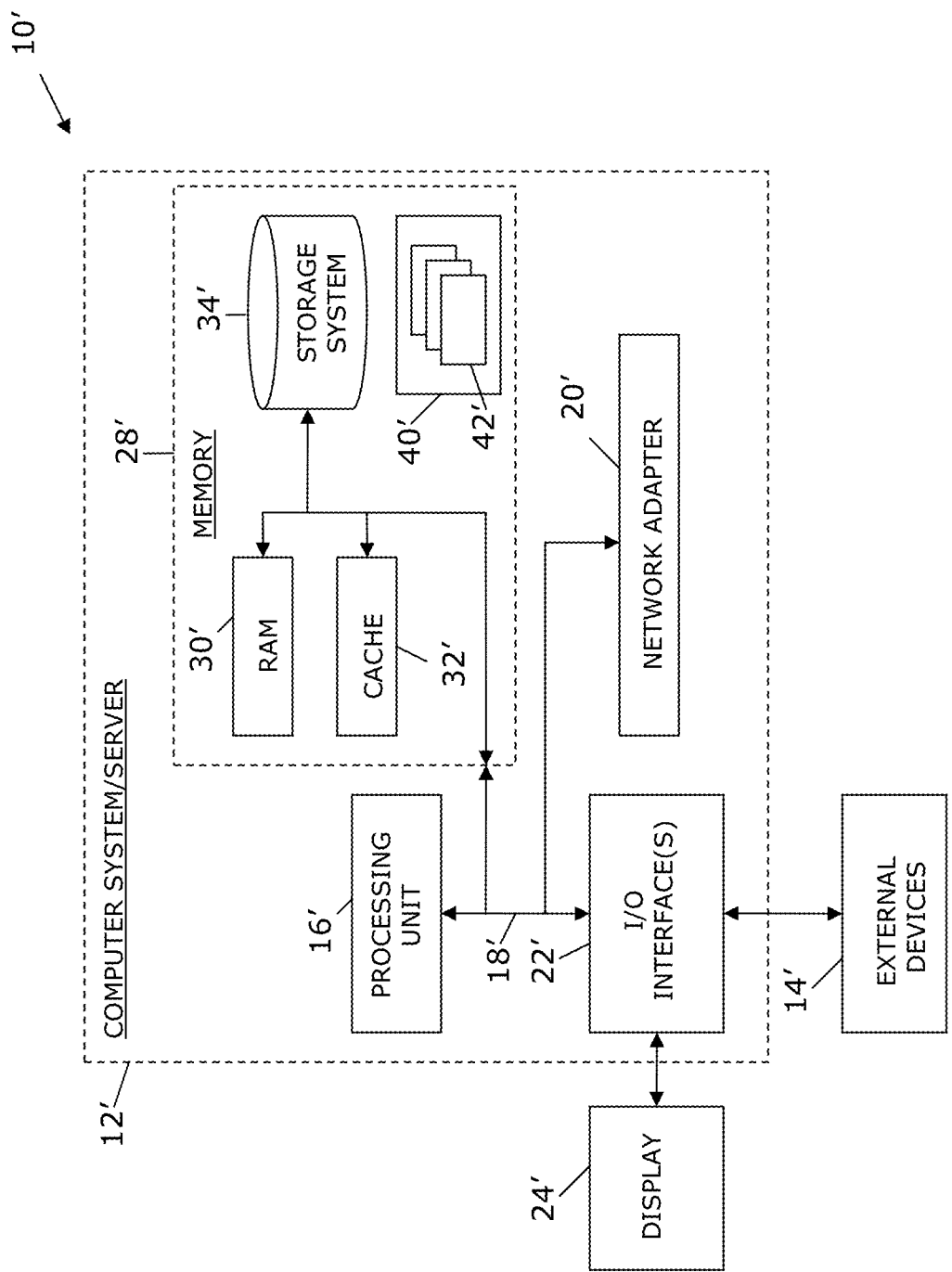
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of handling queries for an online discussion forum, said method comprising:
   receiving a query;
   automatically classifying the query as subjective or objective;
   thereupon calculating, for discussion threads of the query, at least one of:
   a subjectivity score and an objectivity score;
   said calculating comprising:
   applying a maximum entropy model; and
   incorporating, with respect to at least one discussion thread, at least one member taken from the group consisting of: a number of posts in a discussion thread; average number of words in posts, presence of a predetermined pattern among posts, a number of authors of posts within a discussion thread, average depth of each post, maximum depth of a post, and length of at least one reply; and
   determining a degree of relevance to the query of: the discussion threads, and at least one post in the at least one discussion thread;
   said determining of the degree of relevance of the query to the discussion threads comprising:
   iteratively determining a relevance score with respect to each post in a discussion thread and then accepting a maximum relevance score with respect to a post in a discussion thread;
   determining a penalty or reward regulizer with respect to choosing a predetermined number of posts for calculating a relevance score of a thread; and
   including at least one of: a subjectivity score of the thread and an objectivity score of the thread; and
   ranking the discussion threads based on said calculating and determining of a degree of relevance of the query to the discussion threads.

2. The method according to claim 1, wherein said determining comprises determining a degree of relevance to the query of both of: the discussion threads, and at least one post in the discussion threads.

3. The method according to claim 2, wherein said determining of a degree of relevance of the query to the discussion threads comprises collecting top relevant threads and determining a relevance to the query of the top relevant threads.

4. The method according to claim 2, wherein said determining of a degree of relevance of the query to at least one post comprises collecting top relevant threads and determining a relevance to the query of all posts in the top relevant threads.

5. The method according to claim 1, comprising applying learned balancing factors to each of: the relevance score with respect to a post in a discussion thread, the penalty or reward regulizer, and the at least one of: a subjectivity score of the thread and an objectivity score of the thread.

6. The method according to claim 5, wherein the penalty or reward regulizer comprises a calculation of graph cover with respect to the chosen number of posts for calculating a relevance score of a thread.

7. The method according to claim 1, wherein said determining of a relevance score with respect to each post in a discussion thread comprises employing a query likelihood model with smoothing.

8. The method according to claim 7, wherein said employing of a query likelihood model with smoothing comprises determining an average relevance of scorewise top-k posts in a thread.

9. The method according to claim 1 wherein said calculating comprises calculating a subjectivity score of discussion threads of the query upon classifying the query as subjective.

10. The method according to claim 1 wherein said calculating comprises calculating an objectivity score of discussion threads of the query upon classifying the query as objective.

11. The method according to claim 1, wherein said calculating comprises incorporating at least one factor comprising a number of posts in a discussion thread.

12. The method according to claim 1, wherein said calculating comprises incorporating, with respect to at least one discussion thread, at least one member taken from the group consisting of: average number of words in posts, presence of a predetermined pattern among posts, a number of authors of posts within a discussion thread, average depth of each post, maximum depth of a post, and length of at least one reply.

13. The method according to claim 11, wherein said applying of a maximum entropy model comprises employing kernel density estimation to convert non-monotonic features to monotonic features in the maximum entropy model.

14. An apparatus comprising:
   at least one processor; and
   a computer readable storage medium having computer readable program code embodied therewith and executable by the at least one processor, the computer readable program code comprising:
   computer readable program code configured to receive a query;

computer readable program code configured to automatically classify the query as subjective or objective;
computer readable program code configured, to thereupon calculate, for discussion threads of the query, at least one of: a subjectivity score and an objectivity score; wherein to calculate comprises:
applying a maximum entropy model; and
incorporating, with respect to at least one discussion thread, at least one member taken from the group consisting of: a number of posts in a discussion thread; average number of words in posts, presence of a predetermined pattern among posts, a number of authors of posts within a discussion thread, average depth of each post, maximum depth of a post, and length of at least one reply; and
computer readable program code configured to determine a degree of relevance to the query of at least one of: the discussion threads, and at least one post in the at least one discussion thread;
wherein to determine the degree of relevance of the query to the discussion threads comprises:
iteratively determining a relevance score with respect to each post in a discussion thread and then accenting a maximum relevance score with respect to a post in a discussion thread;
determining a penalty or reward regulizer with respect to choosing a predetermined number of posts for calculating a relevance score of a thread; and
including at least one of: a subjectivity score of the thread and an objectivity score of the thread; and
computer readable program code configured to rank the discussion threads based on the calculating and determining of a degree of relevance of the query to the discussion threads.

15. A computer program product comprising:
at least one processor; and
a computer readable storage medium having computer readable program code embodied therewith and executable by the at least one processor, the computer readable program code comprising:
computer readable program code configured to receive a query;
computer readable program code configured to automatically classify the query as subjective or objective;
computer readable program code configured, to thereupon calculate, for discussion threads of the query, at least one of: a subjectivity score and an objectivity score; wherein to calculate comprises:
applying a maximum entropy model; and
incorporating, with respect to at least one discussion thread, at least one member taken from the group consisting of: a number of posts in a discussion thread; average number of words in posts, presence of a predetermined pattern among posts, a number of authors of posts within a discussion thread, average depth of each post, maximum depth of a post, and length of at least one reply; and
computer readable program code configured to determine a degree of relevance to the query of at least one of: the discussion threads, and at least one post in the at least one discussion thread;
wherein to determine the degree of relevance of the query to the discussion threads comprises:
iteratively determining a relevance score with respect to each post in a discussion thread and then accepting a maximum relevance score with respect to a post in a discussion thread;
determining a penalty or reward regulizer with respect to choosing a predetermined number of posts for calculating a relevance score of a thread; and
including at least one of: a subjectivity score of the thread and an objectivity score of the thread; and
computer readable program code configured to rank the discussion threads based on the calculating and determining of a degree of relevance of the query to the discussion threads.

16. The computer program product according to claim 15, wherein said computer readable program code is configured to determine a degree of relevance to the query of both of: the discussion threads, and at least one post in the discussion threads.

* * * * *